United States Patent [19]

McCord

[11] 4,014,751

[45] Mar. 29, 1977

[54] VAPOR GENERATING AND RECOVERING APPARATUS

[76] Inventor: James W. McCord, 9829 Timberwood Circle, Louisville, Ky. 40223

[22] Filed: June 13, 1975

[21] Appl. No.: 586,494

[52] U.S. Cl. .............................. 202/160; 202/170; 202/173; 202/181; 202/206; 62/199; 62/238; 134/90; 134/108; 203/2; 203/99; 203/100; 203/DIG. 4

[51] Int. Cl.$^2$ ........................................ B01D 3/42

[58] Field of Search ............ 134/90, 105, 107, 108, 134/109; 203/24, 26, 2, DIG. 4, DIG. 8, 100, 99; 202/160, 181, 170, 170 D, 173, 206, 235; 62/238, 199, 183

[56] References Cited

UNITED STATES PATENTS

| 2,153,577 | 4/1939 | Levine | 134/109 |
|---|---|---|---|
| 2,700,645 | 1/1955 | Kearney | 202/170 |
| 2,842,143 | 7/1958 | Kearney | 134/90 |
| 3,001,532 | 9/1961 | Plassmeyer | 134/108 |
| 3,028,267 | 4/1962 | Edhofer et al. | 134/105 |
| 3,070,463 | 12/1962 | Barday | 202/170 |
| 3,483,092 | 12/1969 | Young | 202/181 |

Primary Examiner—Wilbur L. Bascomb, Jr.

[57] ABSTRACT

A vapor generating and recovering apparatus for separating one component from a second component of a liquid solution and recovering the first component including at least one chamber for generating vapor from the liquid solution and recovering the vapor in a liquid form, the vapor generating portion of the chamber being in heat emitting relation with a heat emitting means and the vapor recovering portion chamber being in heat absorbing relation with a heat absorbing means. A preferred system for providing heat to the vapor generating portion of the chamber and removing heat from the vapor recovering portion of the chamber is a refrigerating system which includes condensing coils and evaporating coils in heat transfer relation with the vapor generating and vapor recovery chamber.

16 Claims, 5 Drawing Figures

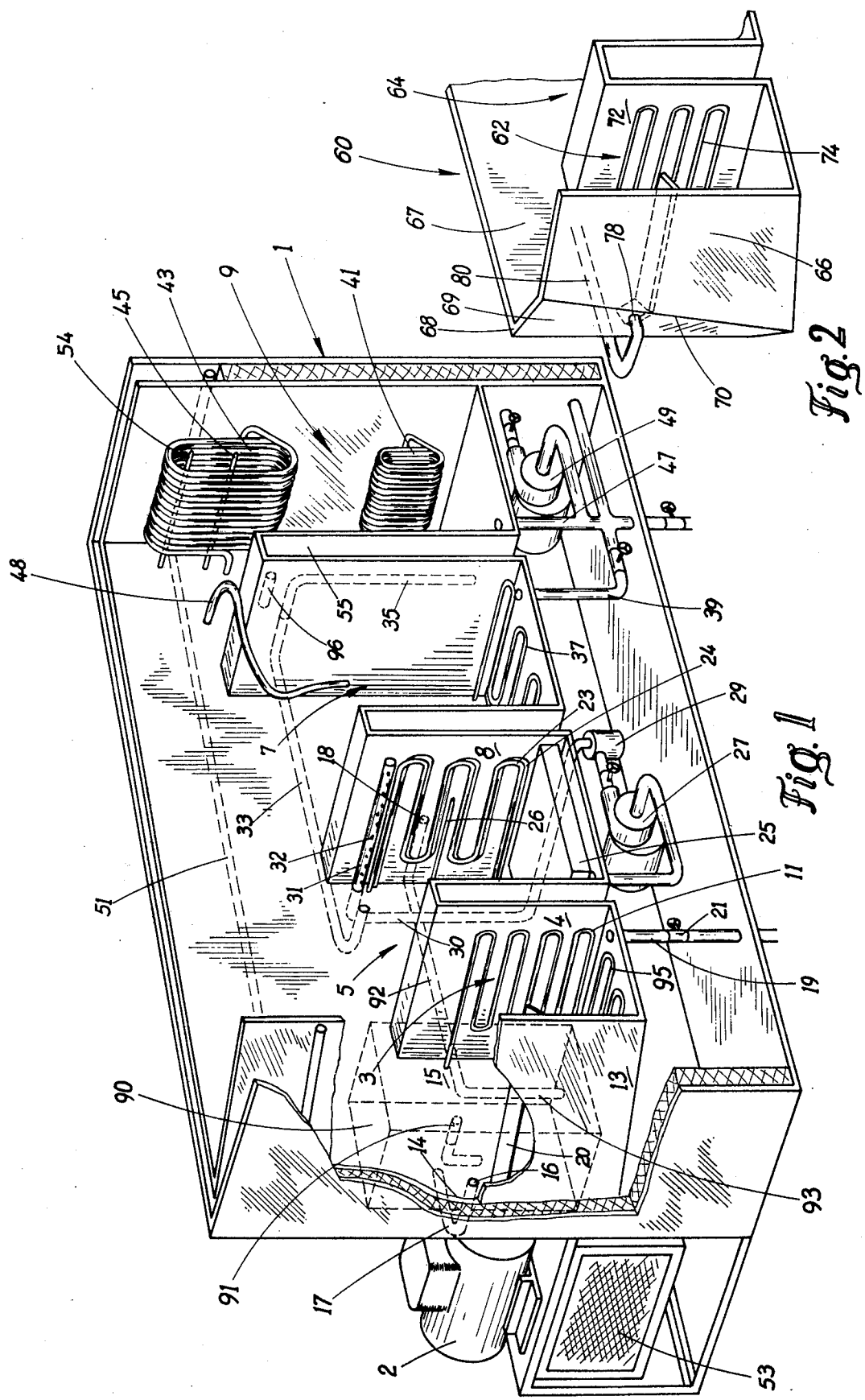

VAPOR GENERATING AND RECOVERING APPARATUS

BACKGROUND OF THE INVENTION

This invention relates to a vapor generating and recovering apparatus for separating one component from a second component of a liquid solution and more particularly relates to an apparatus for recovering and purifying chemicals in a vapor generating device.

In the present state of the art, vapor generating and recovering devices for separating one component from a second component of a liquid solution are utilized in many different areas. For example, in the cleaning of objects such as metallic tools, plastic parts, and the like, hot, boiling solvents have been utilized to remove undesirable particulate matter from these tools, parts, and the like by immersing the soiled object into the hot, boiling solvent. In bringing the solvent to a boiling temperature, a solvent vapor zone is created above the boiling solvent solution in the tank or chamber in which the aforementioned objects are placed for cleaning. The vaporized solvent is then subjected to cooling or condensing means and is recovered. Generally, the chamber or tank from which the solvent is vaporized is filtered or processed by other means to remove the contaminants therefrom and then reused.

SUMMARY OF THE INVENTION

It has now been found that the vapor generating and recovering apparatus for separating one component from a second component of a liquid solution in the cleaning of objects, the cleaning can be accomplished by the utilization of a variable heat system which utilizes substantially all of the energy supplied to a refrigeration system with little or no waste. In this apparatus, a refrigerant compressor is utilized to compress a refrigerant gas and to discharge refrigerant at a super heat condition of high temperature and pressure which is then disposed through a primary condenser to boil a liquid solvent, the liquid solvent generally being a low molecular weight halogenated hydrocarbon, such as, for example, trichloromonofluoromethane, methylene chloride, trifluoroethane and the like. This refrigerant condenser coil is disposed for communicating in heat exchange relation with the cleaning or vaporizing compartment of a vapor generating and recovering apparatus. In the refrigeration condenser section hot gases are condensed to a liquid at relatively high pressures and temperatures wherein the vapor in the cleaning portion of the apparatus utilized therein is evaporating or boiling to create a vapor zone in a given cleaning device. Since more energy is available to this system as heat due to the motor input energy and the motor inefficiencies of the refrigeration system it must be removed. Some of this heat is removed by radiant energy loss, by conduction of heat through the apparatus, and by heat absorbed by the parts being processed. There are occasions where these techniques of heat rejection are not sufficient to totally balance the system. This is accomplished in this system by the use of a complementary condenser utilized to remove this excess heat. This complementary condenser may be placed before the main condenser, after the main condenser or in parallel with the main condenser depending on the given application. The complementary condenser dissipates heat energy either by an externally cooled water or air device. The mechanism of cooling is done automatically by thermostatic or pressure control device. The pressure device generally monitors the heat pressure and thereby automatically adjusts the cooling mechanism. The thermostatic control device senses the vapor level in the apparatus in such a manner that ambient conditions do not effect its operation. In the case of an air cooled complementary condenser the thermostatic sensor varies the fan speed as the vapor sensitizes the device. In the case of a water cooled complementary condenser the flow of water is adjusted automatically to remove only the unused energy by again sensing the vapor temperature in a manner in which the ambient temperature will not effect the device. The water control valve will normally be located on the output line of the condenser but can also be placed on the input line. The air cooled complementary condenser should also be located in such a manner that ambient conditions and a conventional cooling of the compressor body do not remove excessive amounts of heat. In general, this unit is located underneath the shelf mounting the refrigeration compressor.

When more than one chamber is utilized for separating soils, the main condenser may either be placed in series or in parallel with other chambers to provide heat emitting requirements. The solution in other chambers may boil or be heated below the boiling point. In some cases the orientation of this condenser coil will be important to the proper utilization of solvent. The vertical orientation of the condenser on the far wall of the chamber will cause boiling at the far wall to be created in a rolling fashion on the top of this boiling sump. The solvent will roll across the top in a skimming manner. This will cause floating soils to be pushed to the far side wall. This chamber is also so designed to contain a tapered wall so that the material will be directed to a corner of such a chamber and direct the floating soil out an overflow hole or over a weir into another chamber for appropriate disposition of material. This material may either go to a conventional water separator or sub-cooling of the liquid may be employed or to a dirty solvent recovery chamber.

The condensed liquid refrigerant then passes through an expansion valve whereby the temperature and pressure are dropped and the refrigerant liquid passes into the evaporator which is utilized in the recovery portion of the apparatus. In the evaporator portion of the refrigeration system where the cold liquid refrigerant evaporates to a gas, the evaporator becomes the condenser for the solvent saturated vapor. In the evaporator part of the variable heat system there are possibly several additional areas where cooling may be employed to produce maximum operating efficiency. One area employs an expansion valve and an expansion pressure regulator valve to control the flow and pressure of refrigerant to a sub-cooling coil in the water separator to control the cooling capacity within the water separator. The main purpose of this unit is to sub-cool the liquid sufficiently to control the temperature in the cool liquid sump of the vapor recovery portion of the apparatus and to improve water separation. Another expansion valve and evaporator pressure regulator may be utilized to control refrigerant flow to the convection control coil on the apparatus to eliminate the convection of solvent vapor up the side walls of the solvent recovery apparatus. Preferably a peripheral coil is wrapped around the outer portion of the apparatus several inches above the saturated vapor line to cool the metal and provide a temperature barrier. The ability to raise the pressure and temperature in this evaporator line allows the temperature to be above the atmospheric dew point and minimize the introduction of condensed water to the apparatus. Additional evaporators may be employed for temperature control to liquid chambers in the above apparatus as required in a similar manner to those previously described. The main evaporator not only performs the condensing of solvent but also provides a cool ambient for the thermostatic device used for the vapor level control system. The thermostatic device used to activate the complementary condensing system described above is generally placed within the main evaporator so that ambient conditions will not effect its operation. In addition, a vapor level safety device is also contained in this area so that it also will not be influenced by atmospheric conditions. The solvent recovery chamber which contains the main evaporator also provides for a control of vapor movement by the evaporator's low temperature and by the pressure drop experienced within this chamber that a change of phase of vapor to liquid. This technique minimizes the use of solvent in such a device. The refrigerant is then returned to the compressor as a low pressure low temperature super heated gas to complete the refrigeration cycle.

One of the most unique portions of this system is the ability for this device to start without the use of supplementary heat. This is accomplished with the use of a by-pass system to allow the compressor proper conditions to continue operation without ideal thermodynamic conditions. The refrigeration system initially starts off with only the heat of compression supplied by motor energy. Additional heat is quickly obtained from the evaporator by its ability to operate at lower temperatures during start-up. In this manner heat is drawn from the atmosphere and dissipated as heat energy in the condenser. The evaporator temperature is limited by the pressure setting on the by-pass valve. Once the system is in complete balance and the vapor is fully condensing on the evaporator then the refrigeration system is operating effectively and efficiently. During this portion of the operation the by-passing arrangement is not in operation. If for some reason during the operation the vapor should fall below the condensing area then by-pass system will automatically come into operation and allow the system to continue operating. This is all accomplished by pressure differentials in both the evaporator and condenser portions of the system. The use of a receiver and a suction accumulator are generally necessary for the proper operation of the by-passing system. As indicated previously, once the vapor has been established then the system automatically adjusts itself for refrigerating effect and balances the heat and cooling cycles within the system. It should also be noted that the refrigeration compressor operates in this system continuously thereby providing reliability to this mechanical portion of the apparatus.

It has been found also that with the utilization of the aforementioned type system the principals of latent energy have been incorporated. This means that the refrigerant boils in the evaporator which in turn condenses the solvent and the refrigerant liquifies in the condenser while the solvent-soil mixture boils, the solvent being vaporized therefrom. Uniform temperature is experienced throughout these portions of the system to provide for better economics in the recovery of solvents. In addition, the temperature of the refrigeration condenser unit are of reasonably low temperature and are not sufficient to decompose the solvent utilized. This provides a degree of safety experienced from this apparatus.

In preferred utilization of the vapor generating and recovery devices of the present invention, specifically in relation to a vapor cleaning device, a more fully described apparatus is hereinafter discussed.

Various other features of the present invention will also become obvious to those skilled in the art upon reading the disclosure set forth hereinafter.

More particularly, in one preferred embodiment, the present invention provides a vapor generating and recovering apparatus for separating and recovering one component from a second component of a liquid solution comprising: a housing including at least one chamber therein for vaporizing a first component from a liquid solution containing at least two components therein and recovering the vapor in the form of a liquid; heat emitting means disposed in heat emitting relation with the chamber; heat absorbing means disposed around the periphery of the housing at a preselected distance above the chamber; and, a variable heat system including the heat emitting means and the heat absorbing means, the system including a refrigerant compressor for compressing a refrigerant, the compressor being in fluid communication on its discharge side with the heat emitting means, the heat emitting means including coils therein whereby the compressed refrigerant is condensed upon heat exchange relation with the liquid in the chamber, the heat emitting means being in fluid communication with a by-pass system and the heat absorbing means, the by-pass system and the heat absorbing means being in parallel, the by-pass system and the heat absorbing means being in fluid communication with the suction side of the compressor, the by-pass system being operable in response to selected operating conditions of refrigerant discharging from the heat absorbing means.

In another preferred embodiment, the present invention provides a vapor generating and recovering apparatus comprising: a housing including at least one chamber therein for vaporizing a first component from a liquid solution containing at least two components therein and recovering the vapor in the form of a liquid; heat emitting means disposing in heat emitting relation with the chamber, the heat emitting means being disposed along one vertically extending side wall of the chamber; the chamber having an opposed side wall non-parallel to the vertically extending side wall with a third wall disposed therebetween, the third wall extending the maximum distance between the side walls; a fluid flow outlet disposed at a preselected vertical position substantially at the juncture of the third wall with the opposed side wall; a heat absorbing means disposed around the periphery of the housing at a preselected distance above the chamber, the heat absorbing means condensing vapor evolving from the chamber; means to provide heat to the heat emitting means; and, means to absorb heat from the heat absorbing means.

It is to be understood that the description of the examples of the present invention given hereinafter are not by way of limitation and various modifications within the scope of the present invention will occur to those skilled in the art upon reading the disclosure set forth hereinafter.

Referring to the drawings:

FIG. 1 is a perspective view, partially broken away, of a vapor cleaning apparatus utilizing a variable heat system of the present invention;

FIG. 2 is a perspective view, partially cut-away of one preferred vapor generating chamber of the present invention;

Figure 3:
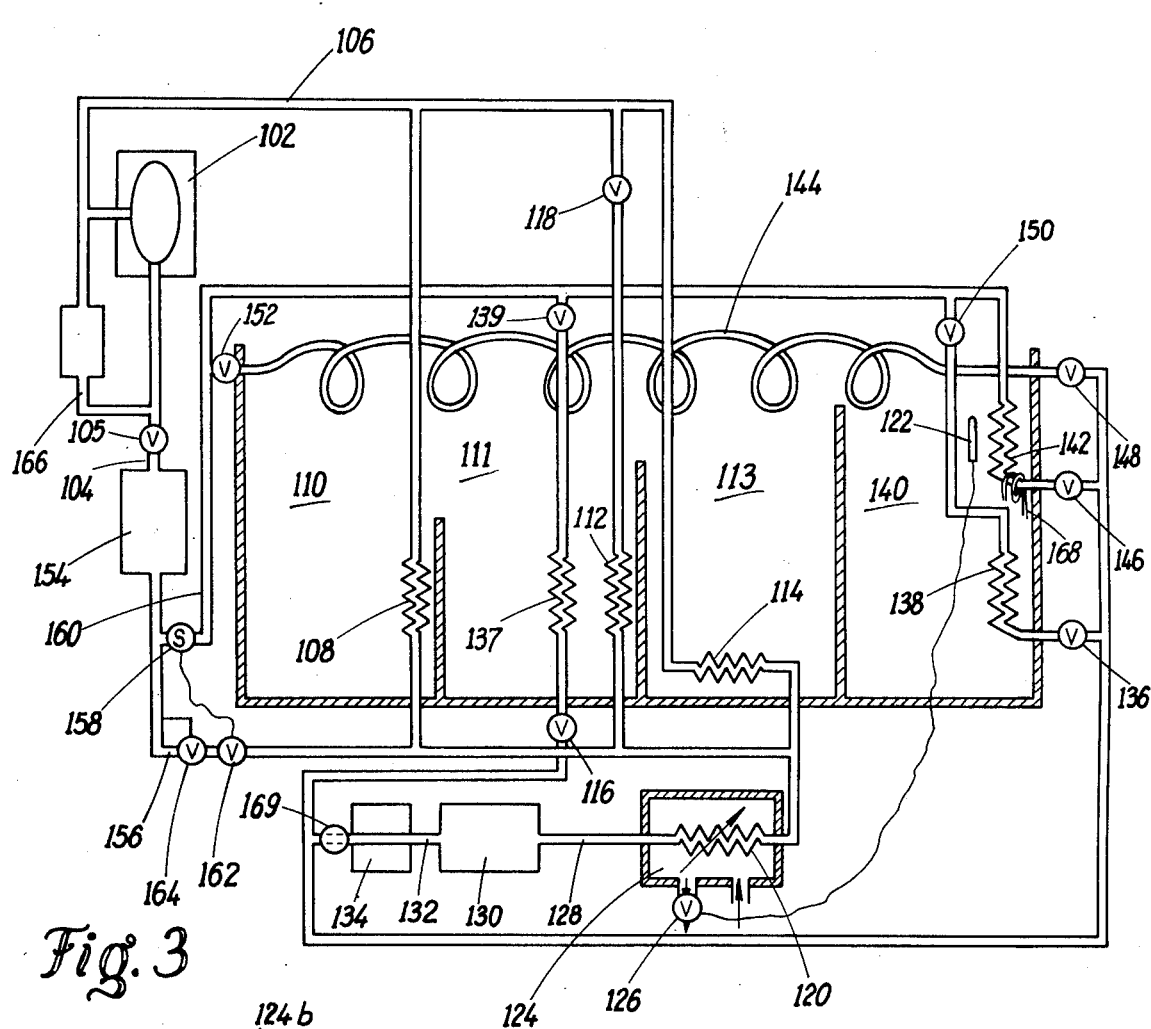
FIG. 3 is a schematic diagram of a variable heat system and the vapor cleaning apparatus of FIG. 1.

In FIG. 1, a housing 1 includes two chambers therein, one for vaporizing one component of a two component system and the other for condensing the vapor and recovering the same as a liquid. The first or vaporizing chamber includes a plurality of sub-chambers 3, 5, and 7 and the condensing and recovering chamber is identified by the numeral 9. These chambers or subchambers are provided therein for the cleaning of objects, specifically those containing greasy substances thereon which may be removed by utilizing a composition containing a solvent. The sub-chamber or chamber 3 includes a heating coil 11 therein disposed along wall 4 which provides heat to a solution which is normally disposed within the chamber 3, the solution containing a vaporizable solvent therein. The heating coil 11 is preferably a condensing coil in a variable heat system to be discussed hereinafter, but may be a coil supplied with heat from other known sources. The coil 11 provides sufficient heat to the chamber 3 to boil and vaporize the solvent therein, the boiling action providing the cleaning power for the solvent solution. Chamber 3 is also provided with a wall 13 which is tapered in relation to the back wall 15. It has been found that by attaching the heating coil 11 to or adjacent to the wall 4, a temperature differential is created across the chamber 3, the temperature differential causing the solution to move toward the wall 13. By constructing the opposed wall 13 in a non-parallel relationship with wall 4, the solution moves to the corner furtherest from wall 4, in this example, the corner 14 formed by the walls 13 and 15. Thus, all of the low density particles which are removed from the objects being cleaned float on or neat the top of the heated solution and migrate rapidly to the corner 14. An aperture 16 is provided at or adjacent to the corner 14 at a preselected position, the position being disposed for alignment with the solution level to be maintained in the chamber 3. A conduit 17 is in fluid communication with the aperture 16 at one end and a liquid or water separator 90 wherein the water or other liquids lighter in density than the solvent are removed therefrom. The separator 90 includes a conduit 91 therein which is disposed at a preselected height slightly below the height of the incoming conduit 17 to remove by gravity the lower density liquid on the top to a drain (not shown). A conduit 92 is also provided with a downwardly extending portion 93 extending to a preselected position above the bottom of the separator to remove the solvent therefrom. The opposed end of the conduit 92 is in fluid communication with an aperture 18 in the wall of chamber 7. Thus, the top portion of the solution in chamber 3 containing the floating dirty particles thereon are removed by the conduit 17 through separator 90 and transferred by gravity through conduit 91 to a drain with the heavier solvent being transferred for reuse to chamber 7.

Construction of the non-parallel wall 13 in chamber 3 may be either in a horizontal or vertical direction as well as other geometric configurations, the only requirement being that aperture 16 in flow through communication with conduit 17 is disposed at or adjacent to the juncture of the walls which is the maximum distance from the coil 11.

It is further noted that in the migration of the boiling solution away from the heating coil 11, the solution moves in a rolling motion. Thus, a baffle plate 20 is provided at the corner 14 at a position a preselected distance below the aperture 16 thereby preventing the rolling action of the boiling solution at the discharge. This prevents low density particles from rolling and building up at the discharge aperture 16 and thereby forces the particles out of the chamber through aperture 16.

At the bottom of the chamber 3, a drain line 19 is provided with a valve 21 therein for periodically draining the chamber 3.

There may also be provided in the bottom of the chamber 3 an additional heat emitting device 95 which is generally used at the start-up of the heating cycle to decrease the heat-up time for bringing the apparatus to operating temperatures.

In chamber 5 a second heating coil 23 is provided to heat up the solution containing the solvent, the heat generally required being that necessary to heat the solution containing the solvent to the required temperature sufficient to perform the intended function which may be boiling the solvent contained therein. The heating coil 23 is generally a condensing coil in the variable heat system which will be discussed hereinafter, but may be a heating coil or element from any other known source.

Chamber 5 is also provided with a sonic vibrating means exemplified as ultrasonic transducer 25, ultrasonic transducer 25 being activated in response to an ultrasonic generator (not shown). The ultrasonic transducer 25 provides ultrasonic vibrations which initiates cavitation in the boiling solvent to remove hard to clean parts from the objects to be cleaned. Generally, chamber 5 is used in the second step in a cleaning process where in the easy to remove dirt or soil is removed in the first step by immersion of the object to be cleaned into chamber 3.

Chamber 5 is further provided with a recirculation system for continually recycling the solution in the chamber and removing particulates therefrom, the system including a pump 27 in fluid communication with a filter 29. Filter 29 is provided to remove the insoluble particulate matter from the solution, returning the filtered solution by way of conduit 30 to the top of the chamber through the spray header 31, spray header 31 being provided with a plurality of spray apertures 32 therein. This filtered solution is resupplied to chamber 5 in a skimming manner from conduit 30 to cause floating soils to be pushed over the weir or wall 4. Also disposed along the top of the chamber 5 is a conduit 33 which extends over and into chamber 9, conduit 33 communicating with a downwardly extending conduit 35. Conduit 35 includes an inlet therein spaced a preselected distance above the bottom of the chamber 9 whereby dry fresh distillate to the chamber 5 is supplied during operation.

The wall 4 which is disposed between chambers 3 and 5 extends in a vertical position, the top of the wall 4 being below opposed walls 13 and 8, wall 8 being disposed between chambers 5 and 7. Wall 4 is of a preselected height, the height being the solution level which is to be maintained in chamber 5. In operation, solution containing dirty materials therein is continually overflowing chamber 5 into chamber 3 as the heating coil 23 which is disposed along the wall 8 provides the driving force for not only vaporizing the solution in chamber 5, but also drives the boiling liquid in a direction toward wall 4.

Also disposed along the wall 4 is a cooling coil 24, cooling coil 24 being generally an expansion coil in the variable heat system which will be discussed hereinafter, but may be a cooling coil receiving cooling media from another known source. Cooling coil 24 is utilized when it is desired to operate the chamber at a temperature below the solvent vaporizing temperature or to protect the device against over heating. A temperature sensing element 26 is disposed adjacent to the coils 23 and 24 to actuate cooling or heating means in response to a preselected temperature condition.

Chamber 7 which receives the overflow containing the chemical solution and particulate matter floating on or near the top of the solution in chamber 3 is provided with a heating coil 27 which is also one of the condensing coils of the variable heat system to be discussed hereinafter, coil 37 being disposed along the bottom of the chamber 7. The solution maintained in chamber 7 is generally heated to and maintained at a temperature equal to or above the vaporizing temperature of the solvent which is in the solution chamber 7 thereby boiling and vaporizing the solvent therefrom. This chamber is also used for a third step in the cleaning process in a cleaning device, primarily the rinsing by condensation of the object which has been cleaned.

Also provided in chamber 7 is a discharge conduit 39 for periodic cleaning and draining of this chamber.

Chamber 9 which is the vapor recovering chamber for the solvent cleaning apparatus of the present invention includes a cooling coil 41 which is an evaporating coil in the variable heat device to be discussed hereinafter wherein the solution in this chamber is maintained at a substantially low temperature, the temperature being low enough to maintain the solvent in a liquid solution. Disposed in the upper portion of the chamber 9 is a second cooling coil or vapor condensing coil 43 which in the variable heat system is an evaporating coil in parallel with the coil 41. The cooling coil 43 being an evaporating coil in the variable heat system absorbs heat from the vapors evolving from chambers 3, 5, and 7 thereby condensing the solvents and collecting the condensed solvents in the chamber 9. Disposed within the vapor condensing coil 43 is a vapor control probe 45 which is a temperature sensing device which actuates a relay or valve (not shown), the relay or valve in turn actuating a complementary condenser 53, to be discussed hereinafter, thereby maintaining a temperature in the zone around the coil 43 at a preselected temperature. The position of probe 45 is provided to sense an artificial ambient temperature in the zone around the coil 43 thereby maintaining coil 43 in a zone or area below actual ambient temperature. This unique feature of controlling the temperature of the area above chamber 9 enables efficient utilization of the variable heat system and also provides efficient control for the condensing of the condensing solvent.

Also disposed in fluid communication with chamber 9 is a conduit 96, conduit 96 being disposed at a preselected level within the chamber 9 to separate water from the heavier density solvent. Conduit 96 at its opposed end is generally in flow communication with a drain (not shown).

In fluid communication with the bottom of the chamber 9 is a conduit 47, conduit 47 being in fluid communication at its opposed end with a pump 49. Conduit 47 in combination with pump 49 provides the means for removing the solvent solution from the chamber 9 and transferring the solution by means, such as a hose 48, to any of the chambers 3, 5, or 7 in order to provide additional solution to the aforementioned chambers. Hose 48 may also be in fluid communication with a fluid source (not shown), in order to provide a fluid seal of the solvents in the chambers during shutdown. The fluid utilized is one that has a low degree of vaporization at ambient temperature and pressure and is lighter in density than the solvent, for example, water.

Another thermostatic sensing device 54 is placed within coil 43 above sensor 45 to detect a rising vapor to an unsafe level. This device 54 is in electrical communication with the power source for the refrigeration unit to deactivate the refrigeration unit at a preselected temperature. This false ambient temperature detection enables the cleaning device to operate without the influence of ambient temperature.

Around the outer periphery of the housing 1 and at a preselected distance above the chambers 3, 5, 7, and 9 is a cooling coil 51, cooling coil 51 being disposed around the outer periphery of the housing 1 enables the inner wall surfaces of the chambers to be left in a substantially smooth condition. The cooling coil 51 is an evaporating coil in the variable heat system and is in parallel with the aforementioned evaporating coils 41 and 43. The cooling coil 51 is provided to maintain a preselected temperature in the housing below the vaporizing temperature of the solvent thereby preventing the vaporized solvent from escaping by convection from the housing. The coil 51 in combination with the cooling coils 43 and 41 adjacent to and in chamber 9, respectively, forces the condensed vapors to move in a direction along the housing from chambers 3, 5, and 7 and into the chamber 9. Since the temperature adjacent to and disposed within chamber 9 is maintained at a level below the vaporizing temperature of the solvent and a pressure drop exists by changing phase from vapor to liquid then the solvent condenses and precipitates into chamber 9 as discussed previously. Coil 51 is normally operated at a temperature above the atmospheric dew point to minimize the introduction of free water into the cleaning apparatus.

In the cleaning apparatus of the present invention, the cooling coil 51 in combination with weir or wall 55, wall 55 being disposed between chambers 7 and 9, define the zone between what is referred to as a vapor zone and a freeboard zone in the cleaning apparatus, the vapor zone being the zone between the top of the chambers 3, 5, and 7 and the cooling coil 51 with the freeboard zone being the area above the vapor zone to the top of the cleaning apparatus.

Also, provided within the housing 1 is a complementary condenser 53 which is utilized to remove excess heat from the system. This complementary condenser 53 is air cooled, as shown, and is actuated in response to the sensing device 45 in the vapor zone of chamber 9, condenser 53 being actuated to operate when the temperature of the vapor zone of chamber 9 exceeds a preselected temperature. It is also realized that the operation of the complementary condenser 53 may be by a pressure sensing device operated from either the high or low pressure refrigerant.

Even further included in housing 1 is a refrigerant compressor 2 which is utilized to compress the refrigerant in the variable heat system of the present invention.

It is realized that the appropriate valving and temperature sensing devices for the variable heat system utilized in the apparatus of FIG. 1 are not shown. However, the exact location of these devices as well as their functions are clearly discussed hereinafter so that one skilled in the art can practice the present invention. Also, it is preferred that the compressor 2 and the complementary condenser 53 be in different planes so that heat is not taken away from the system during operation. In FIG. 1, condenser 53 is mounted underneath the compressor 2.

In the operation of the cleaning apparatus of the present invention, a solution containing a solvent is maintained in chambers 3, 5, and 7 wherein the chambers by means of coils 11, 23, and 37, respectively, maintain a temperature of the solution in these chambers above the vaporizing temperature of the solvent in the solution. Objects which are to be cleaned or degreased are immersed firstly into the solution within the chamber 3 whereby the primary cleaning of the object is accomplished by the dissolution utilizing the heated solvent therein. The objects are then removed from the chamber 3 and inserted into the heated solvent solution in chamber 5 which also includes the ultrasonic transducer 25 therein which not only removes and dissolves the particles remaining on the objects by dissolution, but the ultrasonic transducer 25 provides for pressure waves which removes other particles therefrom by the cavitation action produced by the waves. The objects to be cleaned are then removed and rinsed by submerging the objects in the vapor phase of chamber 7 which also contains the heated solution containing the solvent.

In FIG. 2, chamber 60 including two sub-chambers 62 and 64, is shown to illustrate another preferred geometric configuration of a juncture of a side wall 66 with a back wall 68 at a corner 70 the maximum distance from the opposed side wall 72 which includes heating coil 74 thereon. Back wall 68 is constructed in two sections, one section 67 being in perpendicular relation with side wall 72 nd parallel to a front wall (not shown) with the second section 69 being disposed between and connecting section 67 with side wall 66, side wall 66 being nonparallel in relation to opposed side wall 72. The corner 70 is formed by the joining of section 69 with side wall 66. A flow through aperture 78 is disposed within wall section 69 at a preselected position therein, the position being adjacent to corner 70 and vertically located at the solution level to be maintained in the sub-chamber 62. A conduit 80 is in fluid flow communication with the aperture 78 to remove the overflow from the chamber 62 generated by the rolling action of the solution caused by boiling and the temperature gradient across the chamber set forth by the heat form coil 74 on opposed side wall 72.

In FIG. 3, a preferred variable heat system utilized in the apparatus of FIG. 1 is shown schematically. In the Figure, a compressor 102, of the type used in refrigerating systems, compresses a suitable gaseous refrigerant which flows to the compressor in a refrigerant section conduit 104. Compressor 102 compresses the suitable gaseous refrigerant, which may be freon-22 or the like, to a preselected pressure, and the pressurized hot refrigerant gas flows from the compressor through conduit 106 to a conventional condenser 108 which is generally disposed within a vaporizing chamber 110, the refrigerant being condensed therein and upon condensing vaporizes a solvent which is disposed within chamber 110.

In some devices, it is desired to utilize a plurality of vaporizing chambers and in this instance a plurality of condensing units 112 and 114 are utilized and disposed within vaporizing chambers or sub-chambers 111 and 113, respectively. It is noted that in order to maintain a constant pressure drop across the parallel condensers 112 and 114, pressure regulating valves 116 and 118 are provided to provide the additional pressure drop necessary in order to maintain the constant pressure drop. Thus, the pressure drop across the condensers 108, 112 and 114 are substantially equal.

Also provided downstream of the parallel condensers 108, 112 and 114 is a complementary condenser 120, complementary condenser 120 being utilized to remove excess heat from the boiling system. Complementary condenser 120 is operable in response to a temperature sensing device 122 disposed within one of the chambers, such as chamber 140. It is also realized that the condenser 120 may be operated by other temperature or pressure sensing devices, such as a pressure sensing device actuated in response to preselected pressures on the suction or discharge side of the compressor 102. As shown in FIG. 3 the complementary condenser 120 is disposed within a tank 124 containing a liquid, usually water, wherein the control of the water flow rate is determined by the valve 126 on the discharge side of the tank 124, the valve being operated in response to a preselected operating temperature of temperature sensing device 122.

The condensed or pressurized liquid refrigerant then flows through conduit 128 to a conventional liquid refrigerant receiver 130. From the liquid refrigerant receiver 130, the refrigerant flows by way of conduit 132 through a dryer 134, a moisture indicator 169, then through a plurality of thermoexpansion valves and direct expansion evaporating coils in parallel, each thermoexpansion valve being in series with an evaporating coil. Three evaporating coils 138, 142, and 144 with thermoexpansion valves 136, 146, and 148, respectively, are shown in FIG. 3. The evaporating coil 138 is disposed within a chamber 140 which is utilized for the recovery of the condensed vapor which is generated from tanks 110, 111, and 113, evaporating coil 138 being a sub-cooling coil to sub-cool the liquid in the chamber 140 sufficiently to control the temperature of the liquid thereby improving the separation of water from the recovered condensed vapor. Evaporating coil 142 is provided for condensing the vapors generated from tanks 110, 111, 113 and is disposed at a preselected distance above chamber 140 wherein the vapors coming in contact therewith condense and are recovered within chamber 140. Evaporating coil 144 is a peripheral coil wrapped around the outer portion of the chambers 110, 111, and 113 at a preselected position above the chambers in order to cool the upper portions of the chambers and provide a temperature barrier. The ability to raise the pressure and temperature in this evaporator line allows the temperature to be above the atmospheric dew point and minimize the introduction of condensed water to the apparatus. Downstream of the evaporators 138 and 142, control valves 150 and 152, respectively, are provided to maintain pressure drops across the coils 138 and 142 substantially equal to the pressure drop across the evaporator coil 144. The vaporized refrigerant from the coils 138, 142 and 144 then flows into an accumulator 154 prior to being compressed in the compressor 102.

A by-pass conduit 156 is also provided to by-pass a part of the refrigerant leaving the parallel condensers 108, 112 and 114 in response to the temperature and pressure of the vaporized refrigerant leaving the parallel evaporators 138, 142 and 144. A temperature-pressure sensing device 158 is provided in the conduit line 160 to operate a solenoid valve 162 in response to preselected temperature-pressure conditions of the refrigerant leaving the evaporating coils 138, 142 and 144. A manually operated on-off valve 164 is also provided in line 156.

A by-pass conduit 166 is also provided around the compressor 102, by-pass conduit 166 being utilized in response to low and high pressures developed by the refrigerant system. This is utilized for safety to shut down the system or during pump down operation.

Also provided in the variable heat system of FIG. 3 is a supplementary heat exchange coil 168 which may be utilized for an additional supply of heat to the refrigerant prior to entering the evaporating coil 138, if such additional heat is needed. It is also realized that supplementary heat exchange coil 168 may be inserted directly into the main evaporating coil 138. Means for heating coil 168 may be from any known source.

Figures 4, 5:
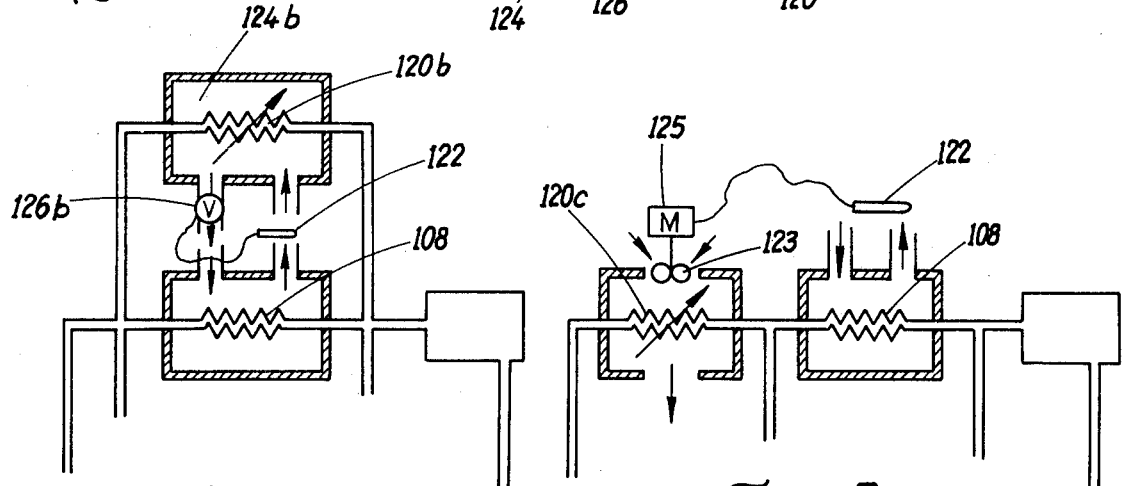
FIG. 4 is a schematic diagram showing one modification of the variable heat system of FIG. 3; and, FIG. 5 is a schematic diagram of a second modification of the variable heat system of FIG. 3.

FIG. 4 illustrates another embodiment of the variable heat system of the present invention wherein the complementary condenser 120 is disposed in parallel with the condenser 108, complementary condenser 120 being illustrated by the numeral 120b. The complementary condenser 120b is disposed within the tank 124b, tank 124b containing a heat transfer fluid therein, such as water. The regulation of the fluid through the tank 124b is by spring operated valve 126b which is actuated in response to temperature sensing device 122.

FIG. 5 illustrates another embodiment of the present invention wherein the supplementary condenser is on the upstream side and in series with the main condenser 108. In this embodiment means for removing heat from a condenser coil 120c is a variable speed fan 123 operated by motor 125, actuation of motor 125 being in response to temperature sensing device 122. In this embodiment, air flows across the condenser 120c is determined by the preselected operating conditions of the temperature sensing device 122.

It will be realized that various changes may be made to the specific embodiments shown and described without departing from the principals and spirit of the present invention.

What is claimed is:

1. A vapor generating and recovering apparatus comprising:
    a housing including at least two chambers therein, a first chamber for vaporizing a first component from a liquid solution containing at least two components therein and a second chamber for recovering said vapor in the form of a liquid;
    heat emitting means disposed in heat emitting relation with said first chamber, said heat emitting means being disposed along and contiguous to a vertically extending first wall of said first chamber; said first chamber having an opposed vertically extending second wall non-parallel to said vertically extending first wall with a third wall disposed therebetween and connecting said first wall with said second wall, said third wall extending the maximum dimension between said first and second walls;
    a fluid flow outlet disposed at a preselected vertical position substantially at the juncture of said third wall with said second wall;
    a first heat absorbing means disposed around the periphery of the housing at a preselected distance above said chambers;
    a second heat absorbing means disposed in heat absorbing relation with said second chamber, said second chamber being disposed to collect said condensed vapors;
    means to provide heat to said heat emitting means; and,
    means to absorb heat from said heat absorbing means.

2. The vapor generating and recovering apparatus of claim 1 including a baffle member disposed below and adjacent to said fluid flow outlet.

3. The vapor generating and recovering apparatus of claim 1 including two sub-chambers therein for vaporizing said first component from said liquid solution, said sub-chambers being separated by a wall of a preselected height, said height defining the solution level in one of said sub-chambers.

4. The vapor generating and recovering apparatus of claim 1 including an ultrasonic transducer in said first chamber.

5. The vapor generating and recovering apparatus of claim 3, said first sub-chamber having said heat emitting, means therein, said heat emitting means being disposed along and contiguous to said first wall of preselected height disposed between said first sub-chamber and said second sub-chamber, said second sub-chamber including a second heat emitting means disposed along a vertical wall opposed to said first wall.

6. The vapor generating and recovering apparatus of claim 5, said second sub-chamber including an ultrasonic transducer disposed therein.

7. The vapor generating and recovering apparatus of claim 5 including a third head emitting device, said third heat emitting device being disposed along the bottom of said first sub-chamber.

8. The vapor generating and recovering apparatus of claim 5, said second sub-chamber including a conduit with an inlet and outlet in fluid communication with said second subchamber, said conduit including means therein to recycle solution in said second sub-chamber and remove particulate matter therefrom during said recycling of said solution.

9. The vapor generating and recovering apparatus of claim 3 including a third sub-chamber therein with a third heat emitting means disposed therein, said third sub-chamber including a fluid flow inlet in fluid communication with said first chamber fluid flow outlet, said first chamber fluid flow outlet being disposed in said first sub-chamber therein.

10. The vapor generating and recovering apparatus of claim 1 including a liquid separator therein, said liquid separator being in fluid communication with said fluid flow outlet of said first chamber, said liquid separator including means therein to separate a low density liquid from said first component and returning said first component to said first chamber.

11. The vapor generating and recovering apparatus of claim 1 wherein said first heat absorbing means is disposed around the outer periphery of said housing whereby said chambers include substantially smooth inner surfaces.

12. The vapor generating and recovering apparatus of claim 1 wherein said second chamber includes means therein for separating water from said recovered vapor in the form of a liquid.

13. The vapor generating and recovering apparatus of claim 12 including a third heat absorbing means in said second chamber.

14. The vapor generating and recovering apparatus of claim 5 including heat absorbing means in said second sub-chamber.

15. The vapor generating and recovering apparatus of claim 1 wherein said vertically extending first wall is of preselected height separating said first chamber from said second chamber, said first wall defining the vapor height of said vaporized first component.

16. The vapor generating and recovering apparatus of claim 1, said chamber including a temperature sensing device therein, said sensing device being in electrical communication with a power source to deactivate said heat emitting means at a preselected temperature.

* * * * *